April 18, 1961 J. R. SUTTON 2,979,911
OFFSHORE EQUIPMENT SUPPORTS AND METHODS OF OPERATING SAME
Filed April 13, 1956 7 Sheets-Sheet 6
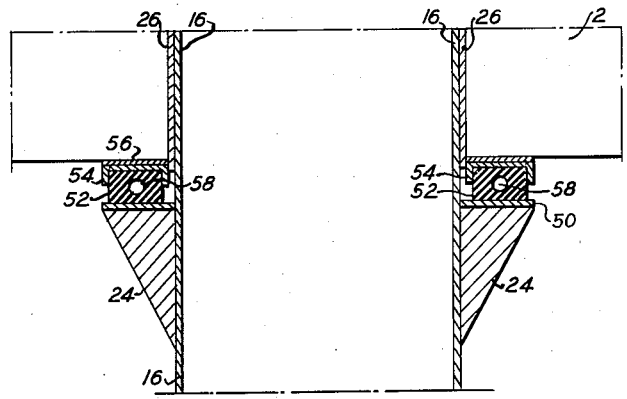
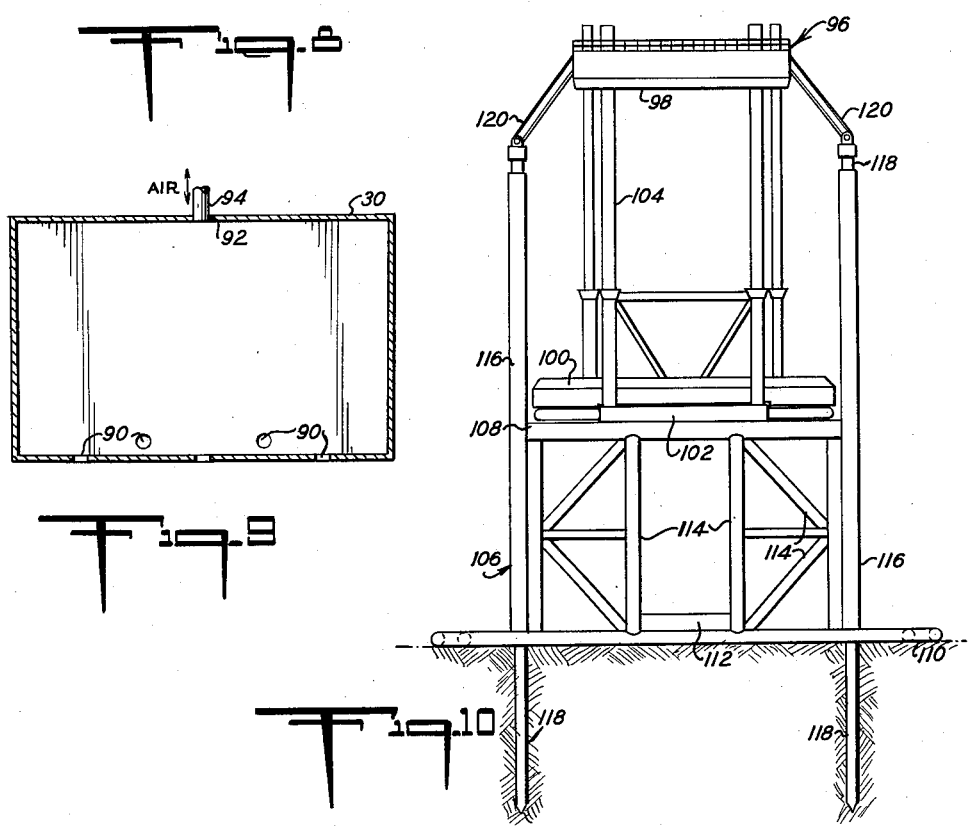
INVENTOR
JOHN R. SUTTON
BY Swecker + Mathis
ATTORNEYS

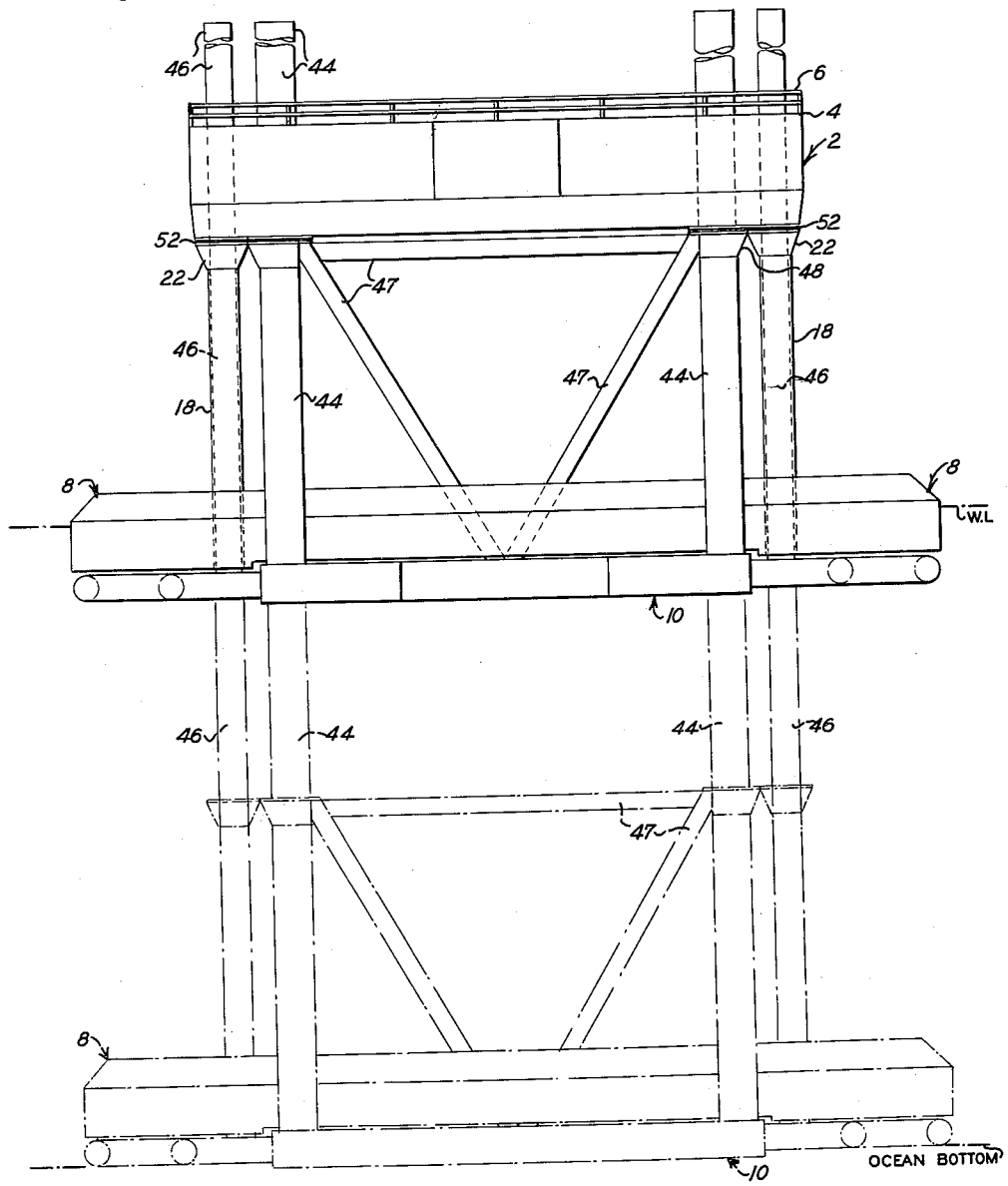

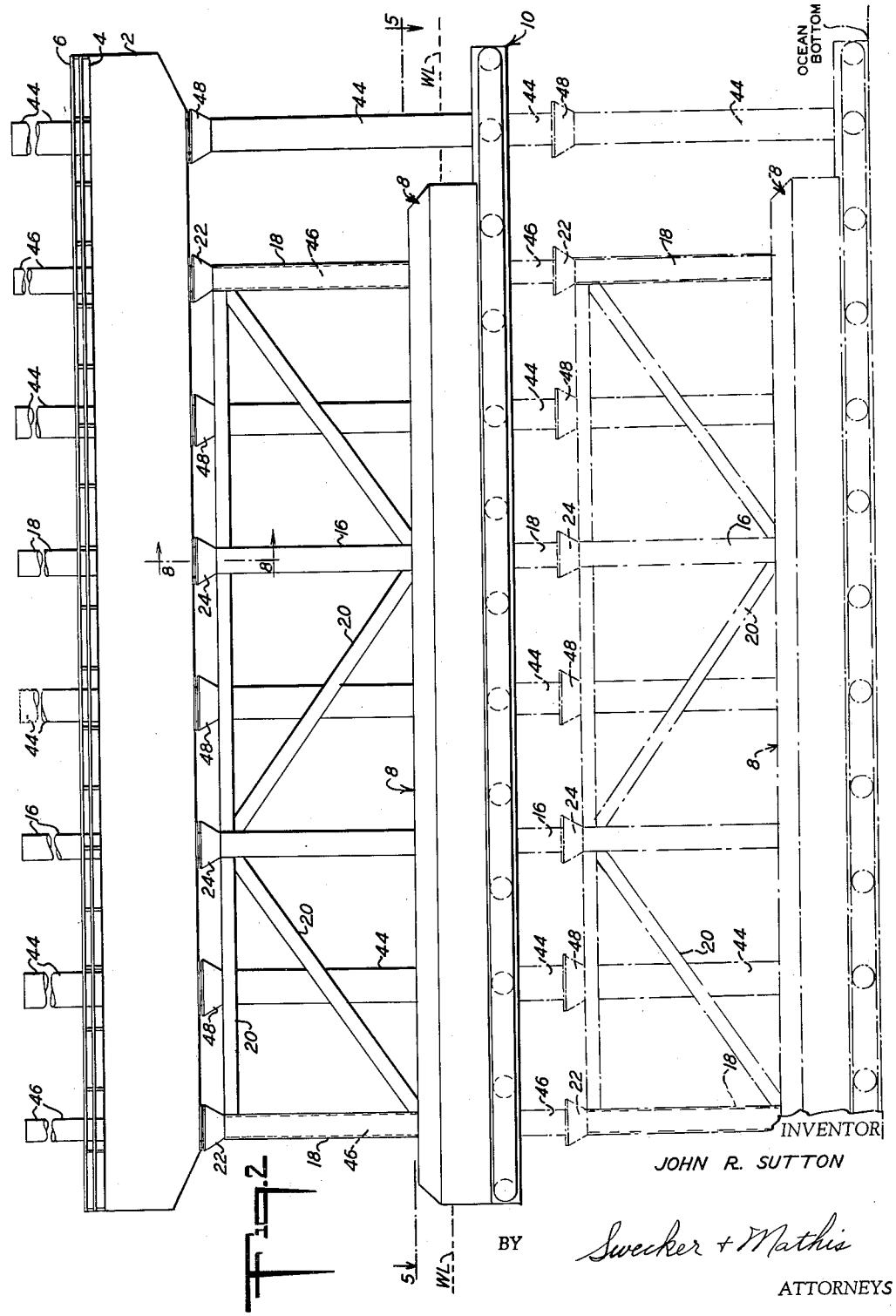

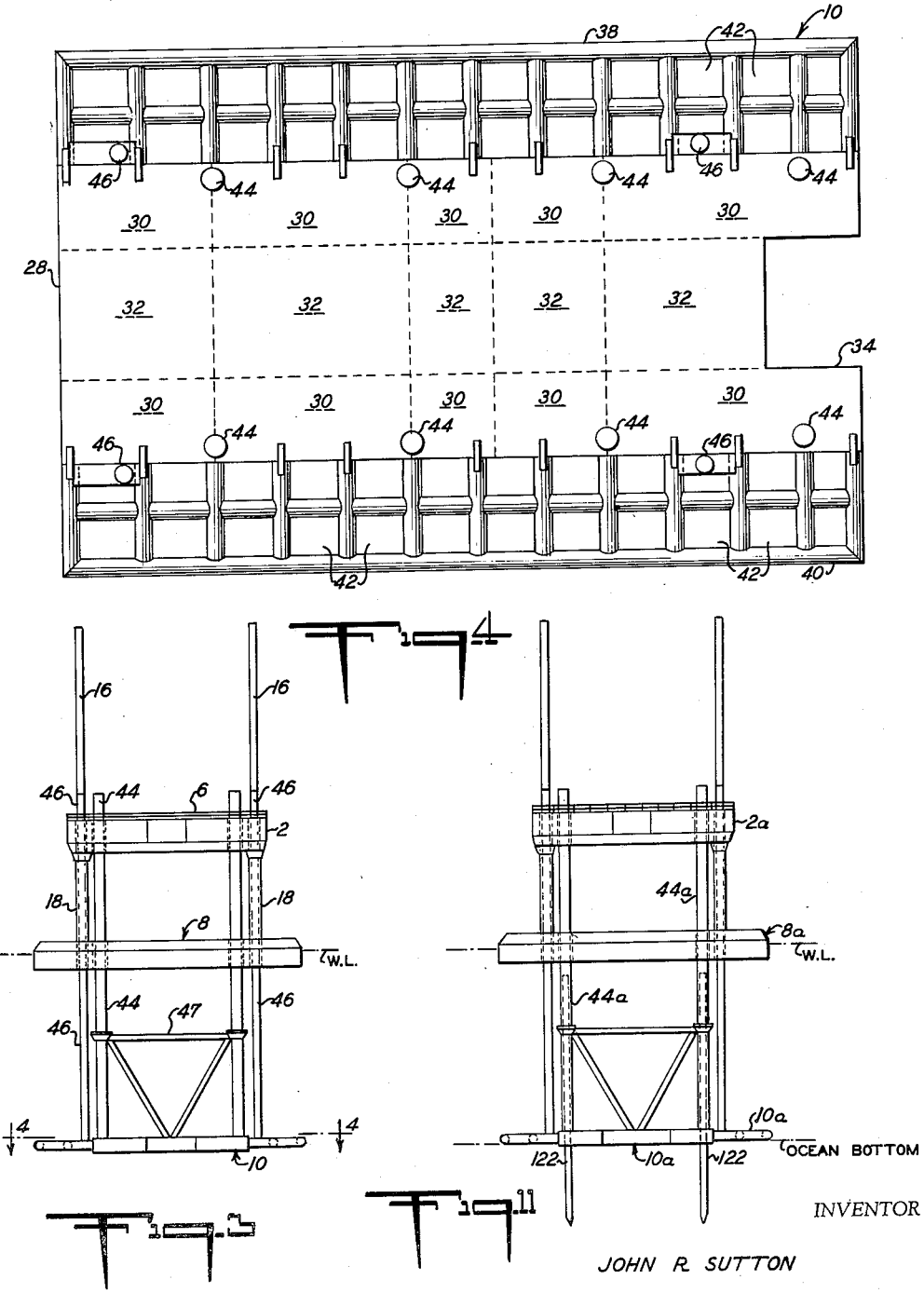

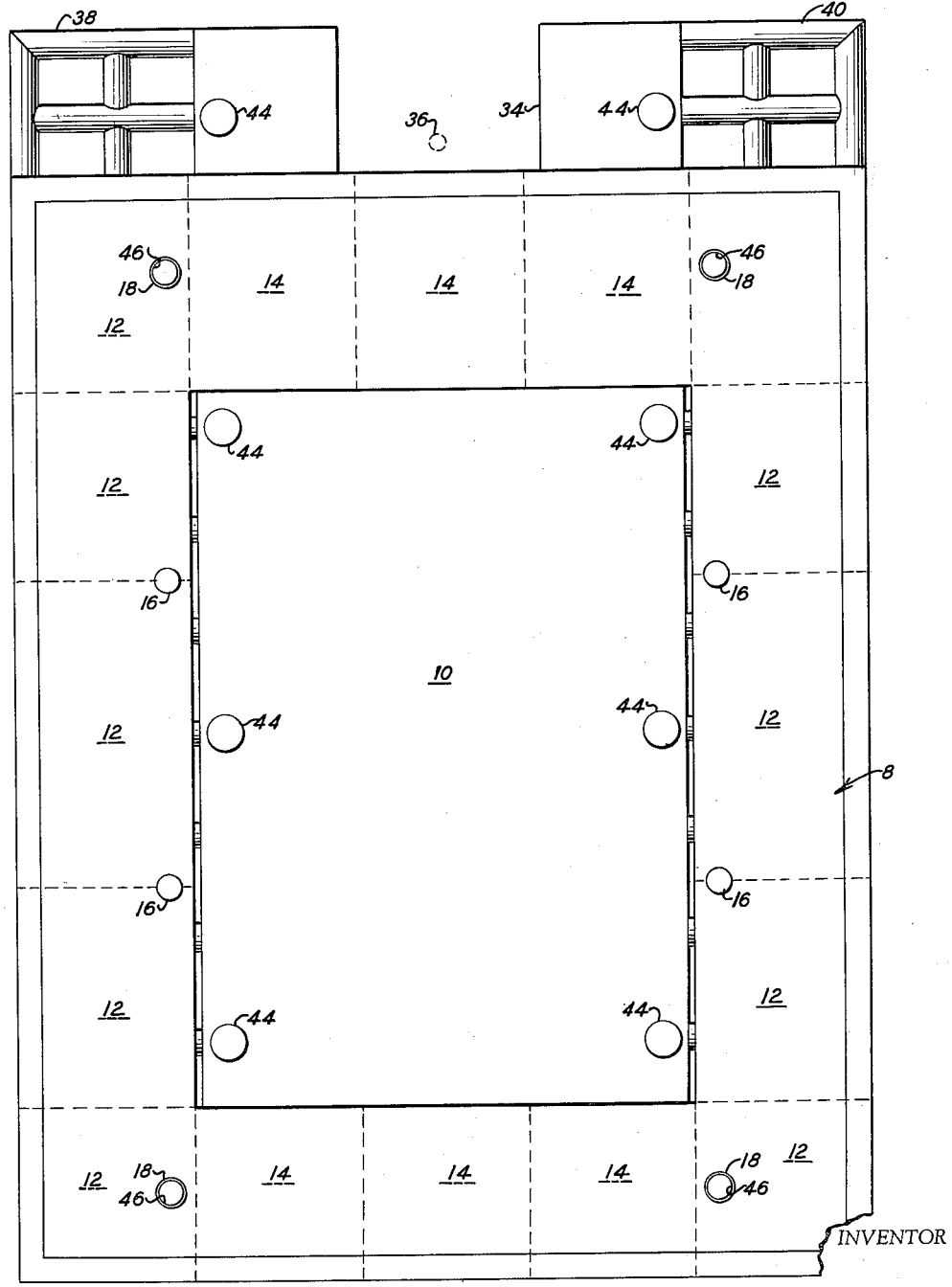

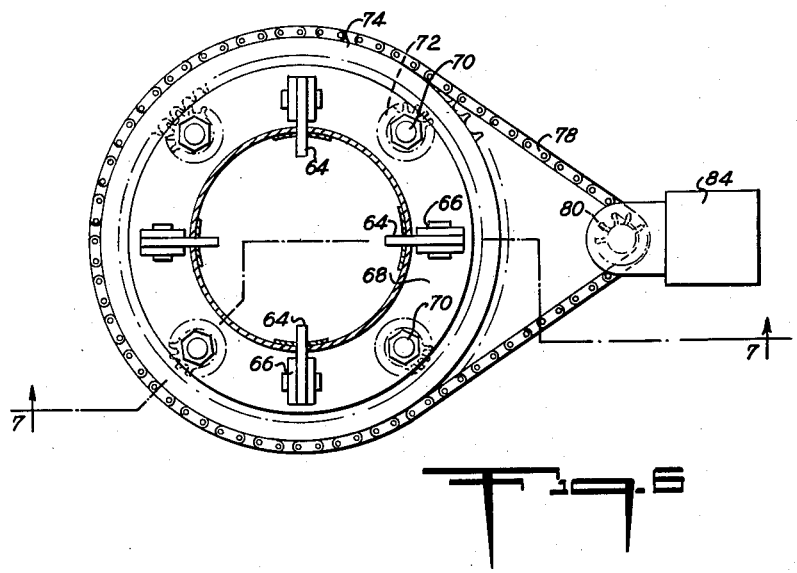
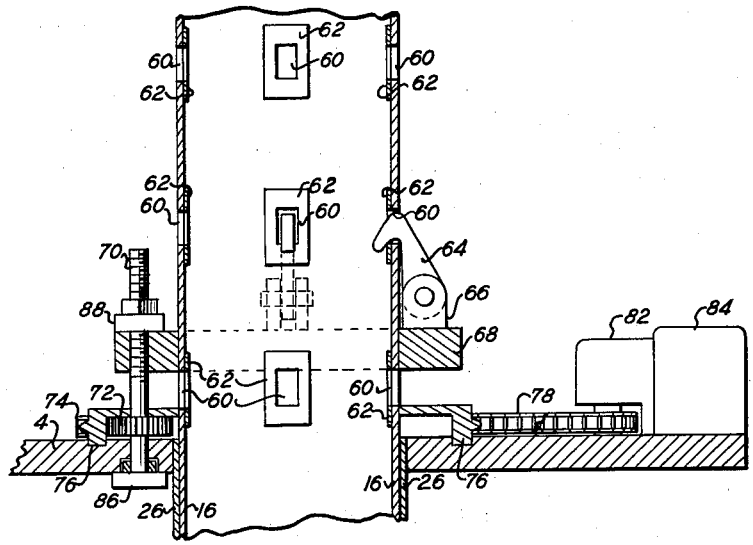

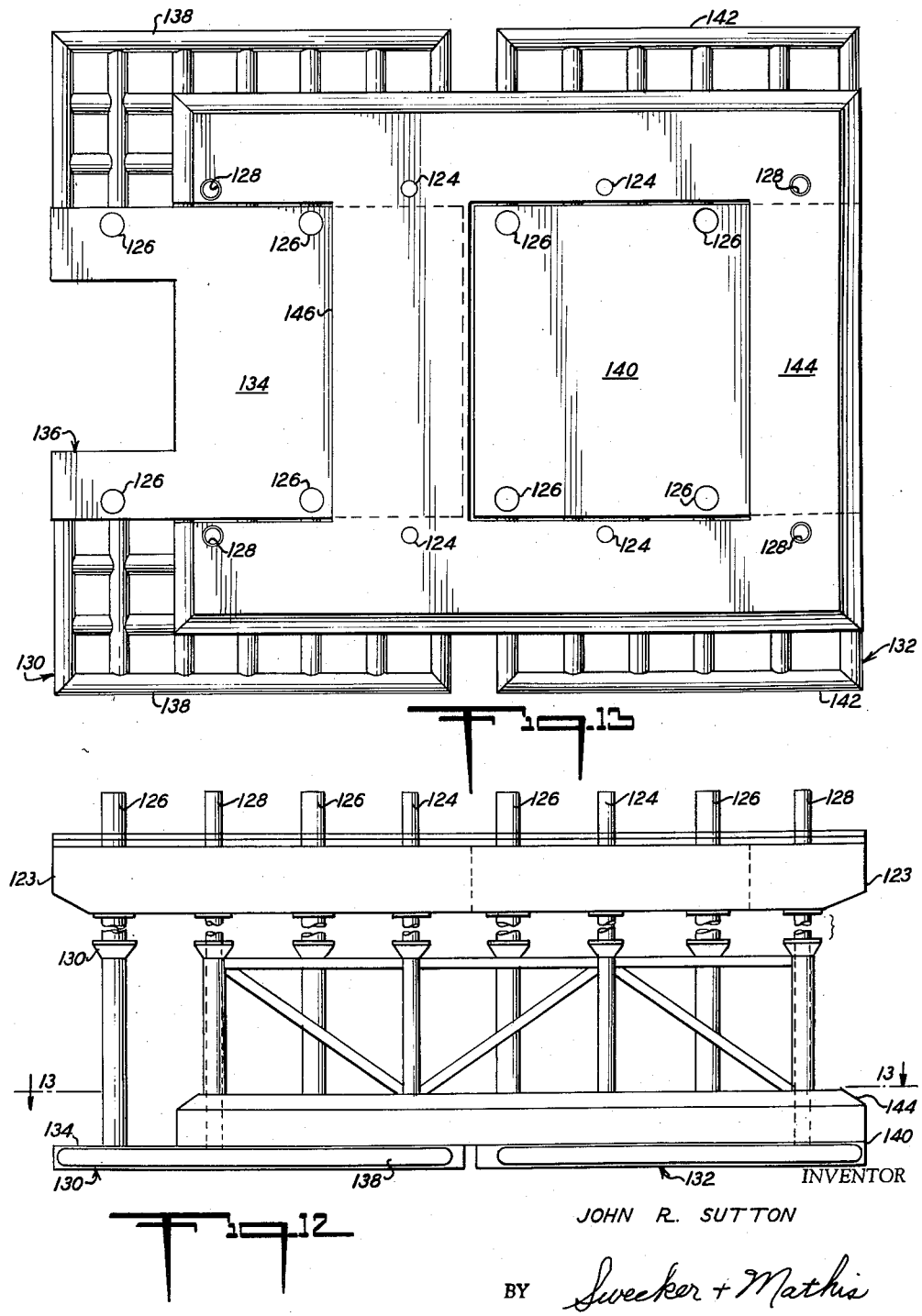

United States Patent Office 2,979,911
Patented Apr. 18, 1961

2,979,911

OFFSHORE EQUIPMENT SUPPORTS AND METHODS OF OPERATING SAME

John R. Sutton, 1133–1189 Calder Ave., Beaumont, Tex.

Filed Apr. 13, 1956, Ser. No. 578,021

8 Claims. (Cl. 61—46.5)

This invention relates to offshore equipment supports and methods of operating same. Although particular reference will be made to the use of such supports in oil recovery operations, other uses, such as for offshore radar stations, for example, will be apparent. This application is a continuation-in-part of my co-pending application Serial No. 530,780, filed August 26, 1955, and now Patent No. 2,900,794.

In recent years much attention has been devoted to the recovery of oil, gas, and other natural resources from lands located beneath bodies of water. In general, the procedure followed has included the erection of a stable equipment support structure or island at the site of the proposed well. Such supports may be formed of one or more barges which may be floated to the desired location in the body of water and then sunk so that they become fixed against movement relative to the bottom of the body of water. The support structures carry all or a part of the machinery and other equipment required for the oil recovery operations to be performed. Tender boats having additional machinery may be used in cooperation with the support structures when desired.

Although the use of offshore equipment supports has proved to be desirable as an approach to the problem of recovering natural resources from lands beneath bodies of water, the structures of the prior art and the methods employed in assembling these structures have been subject to certain disadvantages. Therefore, it is a general object of this invention to provide offshore equipment supports which will function effieciently under the severe service conditions imposed upon them and which may be erected with ease and safety.

Of the prior art structures which have been adaptable for use in waters of different depths, many have included costly jack mechanisms for manipulating the equipment platform relative to the supporting structure thereunder. The elimination of such jacks has been recognized in the art as a possible avenue for reductions in the cost of the structures.

As an example of proposed structures, reference is made to Wilson Patent No. 2,603,068, granted July 15, 1952. According to the disclosure of this patent, the equipment platform has a number of separately controllable barge units mounted for relative vertical movement. The platform is supported by some of the barge units, while the remaining ones are sunk to the bottom, and then the platform is supported from the submerged barges while the rest of the barges are being sunk to the bottom also. The present invention is particularly concerned with the improvement of methods and apparatus of this type.

Other objects of this invention include the improvement of submergible barge units to facilitate control over such units during movements thereof through the water and to increase the effectiveness of such units as ground-engaging foundations, and the provision of novel latching means by which the parts of an equipment support may be connected together.

The foregoing and other objects are achieved by the present invention in a structure which includes an equipment platform, an upper barge unit below the platform, a lower barge unit below the upper barge unit, and vertical columns connected at their lower ends to the barge units and mounted for vertical movement relative to the platform. One significant feature of the present invention is the relationship which is established between the columns attached to the two barge units. These columns are laterally spaced from each other and individually mounted in the platform so that the columns can perform their supporting functions during the setting up of the structure without interference from each other.

The columns serve to support the equipment platform high above the surface of the water at all times. Thus, when the structure is in the fully erected position at an offshore location, the only structural elements which are subjected to wave action are the columns themselves, and these offer a minimum of resistance.

The lower barge unit of this invention incorporates a pipe mat structure which might be adapted to many submergible barges to advantage. Moreover, the lower barge unit may be formed as a single rigid body so that all of its columns must extend in parallelism.

Novel latching means are provided according to this invention for connecting the platform to the columns carried by the barge units. Such latches are easy to operate, and they are adjustable relative to the platform upon which they are mounted. By adjusting the latches it is possible to equalize the loads imposed upon the columns and to level the platform.

Other objects and advantages of this invention will become apparent from a consideration of the following detailed description of certain embodiments thereof illustrated in the accompanying drawings in which:

Fig. 1 is an end elevational view of an offshore equipment support according to the present invention, showing in full lines the positions of the parts as the offshore equipment support is being towed to the desired location in a body of water and showing in dot-dash lines the positions assumed by certain of the parts when the support is set up at the desired offshore location;

Fig. 2 is a side elevational view of the support of Fig. 1, showing in full lines the positions of the parts as the barge is being towed to the desired location, and showing in dot-dash lines the positions of certain of the parts when the support is set up at the offshore location;

Fig. 3 is an end elevational view of the support of Fig. 1, showing the parts in the positions they assume in one stage of the setting up operation;

Fig. 4 is a view taken along the line 4—4 of Fig. 3;

Fig. 5 is a view taken along the line 5—5 in Fig. 2;

Fig. 6 is a plan view of a latch mechanism utilized in the equipment support of the present invention;

Fig. 7 is a sectional view taken along the line 7—7 of Fig. 6;

Fig. 8 is an enlarged fragmentary vertical sectional view taken along the line 8—8 of Fig. 2;

Fig. 9 is a diagrammatic cross-sectional view illustrating the preferred method of controlling the buoyancy of the tanks in the lower barge of the equipment support of the present invention;

Fig. 10 is an end elevational view of a modification of the present invention;

Fig. 11 is an end elevational view of still another modification;

Fig. 12 is a side elevational view of yet another embodiment of the invention; and Fig. 13 is a view taken along the line 13—13 in Fig. 12.

The equipment supports illustrated in the drawings are of a type particularly suited to the requirements of drilling for oil at offshort locations. However, no drilling equipment has been shown, because this may be conventional.

Whatever equipment that is to be carried by the support shown in Figs. 1 to 9 would be supported upon a main platform designated by the numeral 2. This platform should include an upper deck 4 and an interior suitably compartmented to provide machinery spaces, accommodations for workmen, etc. The arrangement of the spaces in the platform 2 forms no part of the present invention and will not be described in detail. There has been illustrated in the drawings a handrail 6 surrounding the upper deck 4 of the platform 2. This feature is usually desirable, but it may be omitted in certain instances.

The platform 2 is supported by upper and lower barge means or units 8 and 10, respectively. The upper barge unit 8 is generally rectangular, as shown in Fig. 5, and it has a rectangular hole extending vertically through its central portion. The size of the upper barge unit 8 can be visualized by a study of Figs. 1 and 2. It will be noted, in this connection, that the barge unit 8 is somewhat wider than the platform 2, but that it is shorter than the platform 2.

The upper barge unit 8 includes two groups of five wing tanks or buoyancy compartments 12 extending along each of its side portions, and also two groups of three end tanks or buoyancy compartments 14. These tanks are provided with suitable means by which the buoyancy of each of the tanks may be controlled in the desired manner. No attempt has been made to illustrate such means, as these form no part of the present invention, and will be obvious to persons skilled in the art. The tanks 12 and 14 are connected together by any suitable means, and the upper and lower surfaces of the assembly preferably are covered by suitable cover structures.

Fixed to, and extending upwardly from the upper barge unit 8, are a plurality of tubular columns 16 and 18. These columns are connected together by bracing members 20 in the manner indicated in Fig. 2 of the drawings to provide a rigid unit. The columns 18 are larger than the columns 16 for a reason which will be apparent as the description proceeds.

At their upper ends, the columns 18 have fixed thereto bearing members 22. Similar bearing members 24 are secured to the columns 16 at the same level as the conical bearing members 22. The conical bearing members 22 and 24 serve to support the platform 2 through suitable shock absorbers, such as that illustrated in Fig. 8.

It should be noted at this point that the bearing members 22 and 24 are so located as to hold the platform 2 well above the surface of the body of water where it will not offer resistance to the passage of waves through the assembly. The assembly is notably "clean" in this respect. As an example, the platform 2 may be some forty-five feet above the surface of the water when the parts are in the towing positions. Also, it is a feature of this invention that the platform 2 remains in its elevated position throughout the setting up operation and during the use of the structure as an equipment support.

Fig. 8 also illustrates the relationship between the column 16 and the platform 2. The platform 2 is provided with a cylindrical sleeve 26 which extends all the way through the platform to provide a guide, or bearing, which slidably receives the column 16. This structure permits the column 16 to move relative to the platform 2 during the setting up of the offshore equipment support of this invention.

With the barge units 8 and 10 in the positions indicated in Figs. 1 and 2, in full lines, the weight of the platform 2 is carried by the conical bearing members secured to the several columns extending upwardly from the barge units.

The lower barge unit 10 (Fig. 4) includes a generally rectangular central barge section 28 made up of two groups of five wing tanks, or buoyancy compartments 30, disposed along its side edges, and a group of five center tanks 32 located between the groups of side tanks 30. The several tanks 30 and 32 may be connected together by any suitable means, and it is preferred that a floor, or the like, be provided to cover the entire assembly of tanks. The central barge section 28 includes a notch or slot 34, extending vertically therethrough at one end of the lower barge unit 10. As shown in Fig. 5, the slot 34 is located in that portion of the lower barge unit 10 which extends beyond the end of the upper barge unit 8. As indicated by the dotted circle 36 in Fig. 5, the drilling shaft of a drilling rig disposed on the platform 2, may be passed through the slot 34. With this arrangement it is possible to withdraw the offshore equipment support from an established location without disturbing the drilling shaft 36. Such withdrawal normally would take place after a well has been completed.

The lower barge unit 10 also includes pipe assemblies 38 and 40 connected to opposite sides of the central barge section 28. Each of the pipe assemblies 38 and 40 is made up of a network of large diameter pipes, welded together to provide a rigid structure.

It will be seen that each of the assemblies 38 and 40 forms a mat having a large number of open spaces 42 extending therethrough. These open spaces contribute materially to the satisfactory operation of the offshore equipment support of this invention. During the lowering of the lower barge unit 10 from the surface of the water to the bottom, the substantial amounts of lateral water movement necessary to permit downward movement of the barge unit 10 make it difficult to maintain the barge unit 10 in a level condition. The open spaces 42 tend to minimize this difficulty in that they allow the water to flow freely relative to the barge unit 10 and, at the same time, channel this flow so as to give kinetic stabilizing forces.

Another characteristic of the assemblies 38 and 40 which contributes to the stability of the barge unit 10 during its descent through the water is that the pipes themselves are tubular and are sealed to prevent the entrance of water, thereby forming outrigger buoyancy units along the edges of the lower barge unit 10. It is preferred that the seal established in connection with each of the pipe mats or assemblies 38 and 40 be permanent, so that they will be somewhat buoyant under all conditions. However, the buoyancy of the pipe assemblies 38 and 40 may be made controllable, if desired, by providing suitable mechanisms for controlling the flooding and evacuation thereof. Such means are well known and need not be described here.

The pipe mats 38 and 40 present advantages in connection with the setting of the lower barge unit 10 upon the ocean floor. The lower surfaces of the individual pipes tend to sink into the ocean floor, and in this condition, movement of the lower barge unit 10 in a direction parallel to the ocean floor is resisted by a large number of spaced surfaces extending at an angle to the ocean floor.

Irregularities in the ocean floor may not affect the level of the lower barge unit 10 at all, in some instances, because of the presence of the pipe mats 38 and 40. These mats may be sunk into high spots on the ocean floor relatively easily. In this connection, it is possible to facilitate the sinking of a pipe mat by jetting water against the ocean floor through flexible pipes extending to suitable pumping equipment located on the platform 2.

The lower barge unit 10 is fixed to the lower ends of two groups of tubular columns 44 and 46. The columns 44 extend upwardly from the central barge section 28 and are so arranged that they may extend to the platform 2 without contact with the upper barge unit 8. In contrast, the columns 46 are located so that they may pass through the columns 18 attached to the upper barge unit 8. As shown in Fig. 5, the columns 46 are located at the four corners of the upper barge unit 8 so that they may serve as guides during the raising and lowering of the upper barge unit 8 relative to the lower barge unit 10.

The reason for the difference in the sizes of the columns 16 and 18 attached to the upper barge unit 10 now will be evident. The columns 18 must be large enough to accommodate the columns 46 extending from the lower barge unit 10.

The columns 44 may contribute to the support of the platform when the parts are in the positions illustrated in full lines in Figs. 1 and 2. For this purpose, each of the columns 44 has fixed to it a conical bearing member 48 similar to the conical bearing members 22 and 24 attached to the columns 18 and 16, respectively.

It may be helpful, at this time, to describe the shock absorber illustrated in Fig. 8. This figure shows the relationship between the conical bearing member 24, carried by the column 16, and the platform 2. However, it will be understood that the relationships between the platform 2 and the other bearing members 22 and 48 are substantially the same.

The conical bearing member 24 has a bearing plate 50 fixed to its upper surface. This bearing plate 50 abuts against resilient shock absorbing means 52 fixed to the lower surface of the platform 2 by bracket means 54. The bracket means 54 may be welded to a plate 56 on the lower surface of the platform 2, and the shock absorbing means 52 may be attached to the brackets 54 by any suitable adhesive, or by mechanical clamps.

The illustrated shock absorbing means 52 is in the form of a hollow block of rubber, or other resilient material. The opening 58 in the center of the block permits the block to deform under load. The shock absorbing means 52 may be shaped as an annulus extending entirely around the opening in the platform 2 which receives a supporting column, or it may be made up of a number of sections.

The arrangement of Fig. 8 is not exactly that which exists at the conical bearing members 22 attached to the columns 18. The columns 18 terminate at the bearing members 22, and the corner columns 46 from the lower barge unit 10 extend upwardly through a bearing sleeve, corresponding to the bearing sleeve 26, in the platform 2.

The central columns 44 of the lower barge unit 10 preferably are connected together by bracing members 47. In the embodiment illustrated in the drawings, the columns 44 are connected in pairs, extending laterally of the barge unit 10.

When the upper and lower barge units 8 and 10 are in position on the ocean floor or bottom, as indicated in dot-dash lines in Figs. 1 and 2, the conical bearing members 22, 24, and 48, are disposed far below the water line. In this position, they cannot contribute to the support of the platform 2 which, it is noted, remains a substantial fixed distance above the water line at all times.

In the lowered positions of the barge units 8 and 10, the platform 2 is supported by the columns 16, 44, and 46, through latches which connect the columns to the platform 2. The latches associated with one of the columns 16 are shown in Figs. 6 and 7. It will be understood that the latches associated with each of the columns 16, 44, and 46, are constructed and mounted in a similar manner.

As shown in Fig. 7, the portion of the column 16 extending upwardly from the cylindrical guide or bearing 26 in the platform 2, is provided with axially spaced groups of openings 60 through its wall. There are four openings in each group, and these are arranged on substantially the same horizontal level. The walls of the column 16 are reinforced adjacent each of the openings by a plate 62, surrounding the opening and welded to the column.

The openings 60 receive latches 64 pivotally mounted upon brackets 66 attached to a mounting ring 68 extending around the column 16. The mounting ring 68 may move relative to the upper deck 4 of the platform 2. Such relative movement is controlled by four screw threaded posts 70 which threadedly engage the mounting ring 68, and which are mounted for rotation in the upper deck 4 of the platform 2. The portions of the posts 70 just above the deck 4 have gears 72 fixed thereto. These gears are rotated simultaneously by a ring gear 74 which rotates in a groove 76 in the upper surface of the deck 4. The ring gear 74 is driven by a chain 78 passing about a sprocket 80 on the output shaft of a reduction-gear mechanism 82 driven by an electric motor 84.

At their lower ends, the posts 70 have enlarged heads 86 which bear against the lower surface of the deck 4 of the platform 2. These heads 86 transmit the weight of the platform 2 to the posts 70, and thence, to the columns engaged by the latches 64.

In some instances it may be found desirable to relieve the strain on the threads of the posts 70 after adjusting the mounting ring 68, by threading a large cap nut 88 onto each post so as to bring its lower face into contact with the upper face of the mounting ring 68.

The purpose of mounting the latches 64 for movement relative to the upper deck 4 of the platform 2 is to widen the range of positions which the columns 16, 44, and 46, may assume relative to the platform 2. If the latches 64 were fixed directly to the platform 2, the relative location of the columns and the platform 2 would be limited by the spacing of the holes 60 in the columns, and it is obvious that these holes cannot be very close together without sacrificing much of the strength of the columns. These limitations can bring about serious stresses in certain of the columns when the bottom of the ocean is not absolutely level because it is not possible to balance the load on several columns accurately. The present invention overcomes this difficulty in that the loads on the columns and the level of the platform can be adjusted by raising or lowering the mounting ring 68 for the latches 64 relative to the upper deck 4 of the platform 2.

Another advantage resulting from the use of the movable mounting rings 68 is that the load may be removed entirely from any given one of the supporting columns when it is desired to move the latches 64 out of engagement with the holes 60 in such column. This may be accomplished easily and quickly by raising the mounting ring 68 relative to the upper deck 4 of the platform 2. With the load removed from the latches 64, they may be pivoted out of engagement with the holes 60 without difficulty.

It will be apparent also that the illustrated arrangement of latches 64 and movable mounting rings 68 associated with the supporting columns has utility in constructions other than that shown in the drawings. For example, this arrangement may be used in place of the complicated jacks found in some prior constructions for elevating a platform above the surface of the water. The threaded portions of the posts 70 may be as long as necessary to permit the desired relative movement between the columns and the platform.

Fig. 9 illustrates diagrammatically a method of controlling the buoyancy of the buoyancy compartments or tanks 30 and 32 in the lower barge unit 10. In this diagram, one tank 30 has been illustrated as having holes 90 in its bottom surface, and in the lower portions of its side walls. The tank 30 also has an opening 92 in its upper wall for receiving a hose, pipe, or the like, 94, through which compressed air may be introduced in the upper portion of the tank 30. It will be understood that the pipe 94 might extend into the tank 30 through an opening in the upper portion of a side wall, if desired. Also, it will be understood that the pipes 94 from the several tanks or buoyancy compartments must lead eventually to the platform 2 of the offshore equipment support of this invention. Suitable control apparatus is located on the platform 2 and is operated to regulate the pressure of the air introduced into the pipes 94.

Control of the buoyancy of the compartment 30 of Fig. 9 is achieved by control of the air pressure in the pipe 94. As long as this pressure exceeds the hydrostatic pressure at the openings 90, the tank 30 will be filled with air. When, however, the hydrostatic pressure at the openings 90 exceeds the air pressure, water will enter the openings 90 until the two pressures are equalized, or until the tank 30 is completely flooded.

This method of buoyancy control has the important practical advantage that it makes the bottom of the tank 30 expansible, in the sense that if this bottom is punctured by a sharp object on the ocean floor, no harm is done. The new hole would affect the buoyancy control in the same manner as the holes 90 already provided. Additionally, it should be noted that the external and internal pressures to which the walls of the tank 30 are subjected are always substantially equal. This is important in connection with deep water operations, as it permits the use of a much lighter tank structure.

The setting up operation for the offshore drilling support illustrated in Figs. 1 to 9 now will be described. As the support is being towed to the desired location in a body of water, the two barge units 8 and 10 are in the positions indicated in full lines in Figs. 1 and 2. At this time both barge units 8 and 10 are buoyant, and both contribute to the support of the platform 2 through the bearing members 22, 24, and 48. The total buoyancy, and hence, the freeboard and draft, can be controlled by flooding certain of the compartments of either the upper or the lower barge units.

When the equipment support arrives at the desired offshore location, the first step in setting up the support on the ocean floor is the sinking of the lower barge unit 10. The buoyancy preferred is such that the unit will float with all of the wing tanks 30 flooded, but will sink below the surface when the centermost one of the group of tanks 32 is flooded. Thus, by first flooding the wing tanks 30 and then flooding the centermost one of the tanks 32, the lower barge is caused to start sinking slowly. At this time, the pressure of the air in the unflooded tanks 32 is held at a fixed value.

As the barge 10 moves downward, the hydrostatic pressure increases and compresses the air in the other four center tanks 32, reducing the buoyancy of these tanks. At this same time, however, there is an increase in the buoyancy of the barge unit 10 by reason of the fact that the watertight lower end portions of the columns 44 and 46 are being submerged. The sizes of the tanks 32 and the columns 44 and 46 preferably are such that during sinking the loss in buoyancy of the tanks 32 is approximate the increase in buoyancy of the vertical columns 44 and 46 and the braces 47. Thus, the component of vertical forces causing the barge to sink is about the same when the barge is 100 feet below the surface of the water as it is at the surface of the water, and there is no acceleration of the structure during sinking. When the lower barge unit 10 reaches the bottom, all of the tanks 32 may be flooded to increase the stability of the barge 10, which now serves as a foundation. Then, the columns 44 and 46 are attached to the platform 2 by means of the latches 64 associated therewith. This condition of the several parts is illustrated in Fig. 3 of the drawings.

The next step in setting up the equipment support of this invention involves the transfer of the weight of the platform 2 to the columns 44 and 46, carried by the lower barge unit 10. This is accomplished by quickly flooding the ten side or wing tanks 12 of the upper barge unit 8. This can be achieved by providing the wing tanks with large flooding valves.

The buoyancy of the ten wing tanks 12 is such that when these tanks are flooded, the end tanks 14 provide merely enough buoyancy to keep the upper barge unit 8 afloat. Therefore, when the wing tanks are flooded quickly, there is a sharp increase in the draft of the upper barge unit 8, causing the conical bearing members 22 and 24 to drop quickly from contact with the lower surface of the platform 2. In this condition, the entire weight of the platform is carried by the columns 44 and 46 attached to the lower barge unit 10.

The sinking of the upper barge unit 8 to the position illustrated in dot-dash lines in Figs. 1 and 2 is brought about by flooding the two end tanks 14 located along the center line of the barge unit 8. As the barge unit 8 begins to sink, the endmost ones of the two groups of end tanks 14 are in a buoyant condition. These tanks are pressure tanks, and they are not open to the sea in the same sense that the tanks 30 of the lower barge unit 10 are open to the sea. Therefore, the displacement of the end tanks 14 remains substantially constant unless some positive action is taken to alter this displacement.

The result is that the upper barge unit 8 will sink to a depth of about 50 feet before the increase in buoyancy caused by the sinking of the columns 16 offsets the slight negative buoyancy brought about by flooding of the center end tanks. This equalization of forces brings the barge unit 8 to a stop approximately 50 feet below the surface of the water, and assures the effective control of the descent of this barge unit.

Further sinking of the upper barge unit 8 is brought about by flooding the four corner end tanks 14 to allow the barge to settle slowly on top of the lower barge unit 10.

The setting up operation is completed by latching the columns 16 to the platform 2. In latching the several columns to the platform 2, it is possible to manipulate the latch supporting rings 68 so as to bring the platform 2 into a level condition and to equalize the load carried by the individual columns.

After the equipment support has served its purpose at the given location, it may be removed from that location by a reversal of the above procedure. In manipulating the buoyancy of the lower barge unit, the endmost ones of the four center tanks 32 may be blown out completely to break the lower barge unit loose from the bottom of the body of water. The buoyant forces created in this manner would raise the lower barge unit to a level close to the surface of the water. Then, the fifth center tank 32 could be blown out to cause the lower barge unit 10 to move slowly up under the upper barge unit 8.

The embodiment illustrated in Figs. 1 to 9 is suited to depths up to approximately 100 feet. When greater depths are required, one can increase the lengths and sizes of the columns of the embodiment of Figs. 1 to 9, or use additional support elements or base, as shown in Fig. 10.

Fig. 10 shows an offshore equipment support assembly 96 which includes a platform 98, an upper barge unit 100, a lower barge unit 102, and groups of columns 104. These elements correspond to the elements of the embodiment shown in Figs. 1 to 9 of the drawings, and no further description of them is required. The lower barge unit 102 rests upon a support or base unit 106, the upper surface 108 of which may be flat and may be connected, after the erection of the support, to the lower barge unit 102. The base 106 includes a pipe mat 110, a barge section 112 of controllable buoyancy, and suitable supporting columns and braces 114 for the upper surface 108 thereof. It is contemplated that the upper surface 108 of the base 106 may be 100, or more, feet above the bottom of the ocean.

The base 106 also includes tubular columns 116 which extend upwardly to a level above the water line. These columns receive piles 118 which are driven deep into the ocean floor to prevent shifting of the structure.

Cables 120, preferably connect the upper ends of the piles 118 or the columns 116 to the platform 98, to enhance the lateral stability of the platform.

In setting up the structure of Fig. 10, the base unit 106 and the assembly 96 are floated to location separately. Upon arrival, the buoyancy of the base unit 106 is decreased to allow the base to sink to the ocean bottom. The piles 118 then may be driven to pin the base unit 106 in position.

With the base unit 106 submerged, the assembly 96 is moved into position over the base unit, and then the parts of the assembly are moved in the same manner as described above in connection with Figs. 1 to 9, to cause the assembly 96 to rest upon the base unit 106. The cables 120 may be fixed in position at any time, but it is preferred that this operation be the final step in the process of setting up the structure.

Another modification of the invention is illustrated in Fig. 11. This view is very similar to Fig. 3, and the numerals 2a, 8a, 10a, and 44a have been applied to certain of the parts to indicate that these parts correspond exactly with parts 2, 8, 10, and 44 of the embodiment of Fig. 3. Comparing Fig. 11 with Fig. 3, it will be seen that the only difference is that in Fig. 11 piles 122 have been driven through the columns 44a into the ocean floor. These piles preferably are driven after the lower barge unit 10a has been positioned on the ocean floor and before the columns 44a have been latched to the platform 2a. It will be understood, however, that the driving of the piles may take place at other times if necessary.

The embodiment of the invention illustrated in Figs. 12 and 13 includes an equipment platform 123 supported by columns 124, 126, and 128. These elements correspond, respectively, to the platform 2 and the columns 16, 44, and 46 of the embodiment illustrated in Figs. 1 through 9. Bearing members 130 are provided on the columns for supporting the platform 123 as it is being towed to an offshore location, and the platform 123 is provided with suitable latching means for connecting the platform to the columns after the base structure has been lowered to the bottom of the body of water.

In this embodiment, the lower barge means is in the form of two spaced barge sections 130 and 132. The barge section 130 includes a barge element 134, having a large drilling notch 136 in an end thereof, and a pair of pipe mats 138 on opposite sides of the barge element 134. The barge section 132 also includes a barge element 140 and a pair of pipe mats 142 on opposite sides of the barge element 140.

Disposed above the lower barge means is an upper barge unit 144. This unit is similar to the upper barge unit 8 of the embodiment shown in Figs. 1 to 9, except that its shape is slightly different. As shown in Fig. 13, one of the rows of transversely extending buoyancy compartments of the barge unit 144 has been moved inwardly from the end of the unit to form an open ended slot 146 through which all four of the large columns 126 extend upwardly from the lower barge section 130.

This arrangement permits the separation of the lower barge section 130 from the rest of the structure after a well has been completed at a given location. In this way, the lower barge section 130 may be left on location to form a base for a completion platform while the rest of the structure is moved on to another location. Complete separation of the lower barge section 130 from the platform 123 is brought about by severing the upper ends of the four columns 126 attached to the lower barge section 130.

In this embodiment, the corner columns 128 preferably are not attached to the lower barge sections 130, 132. It is sufficient that they bear against these lower barge sections by gravity and under the influence of the loads imposed upon their upper ends.

The method of setting up the structure shown in Figs. 12 and 13 is substantially the same as that described above. The only difference is that the buoyancy of the two lower barge sections 130 and 132 must be separately controlled to bring about the desired rate of descent of these sections. The sections 130 and 132 may descend either simultaneously or sequentially.

Although certain embodiments of the invention have been described in detail, various modifications and variations will be obvious to persons skilled in the art. It is intended, therefore, that the description should be considered as exemplary only and that the scope of the invention be ascertained from the claims which follow.

I claim:

1. A structure for supporting equipment at an offshore location in a body of water comprising an upper barge unit having a buoyancy which is controllable over a sufficient range to cause said upper barge unit to float or sink as desired, lower barge means below said upper barge unit and having a buoyancy which is controllable over a sufficient range to cause said lower barge means to float or sink as desired, an equipment platform above the level of the waves to be expected at said location and above said upper barge unit, a first group of substantially vertical support columns fixed to said upper barge unit and connected to said platform for vertical movement relative thereto, a second group of substantially vertical support columns fixed to said lower barge means and connected to said platform for vertical movement relative thereto, the columns of said second group being spaced laterally away from the columns of said first group, means fixed on certain of said columns of each of said groups for receiving the weight of said platform whereby said platform may be supported in part by each of said groups of columns or completely by either one of said groups of columns, and means for releasably fixing each of said columns against movement relative to said platform so that after vertical movement of a column said platform may be supported thereby.

2. A structure for supporting equipment at an offshore location in a body of water comprising an upper barge unit having a buoyancy which is controllable over a sufficient range to cause said upper barge unit to float or sink as desired, a lower barge unit below said upper barge unit and having a buoyancy which is controllable over a sufficient range to cause said lower barge unit to float or sink as desired, buoyant pipe mats on opposite sides of and secured to said lower barge unit, each of said pipe mats being made up of a plurality of hollow pipes located in a plane generally parallel to the plane of said lower barge unit and being secured together so as to leave open spaces therebetween, an equipment platform above the level of the waves to be expected at said location and above said upper barge unit, a first group of substantially vertical support columns fixed to said upper barge unit and connected to said platform for vertical movement relative thereto, a second group of substantially vertical support columns fixed to said lower barge unit and connected to said platform for vertical movement relative thereto, the columns of said second group being spaced laterally away from the columns of said first group, bearing members fixed to the exterior of certain of the columns of each of said groups at levels such that said platform may rest on the bearing members when the barges are afloat to support said platform at the desired elevation above the surface of the water, and latch means carried by said platform for releasably fixing each of said columns against movement relative to said platform so that after vertical movement of a column said platform may be supported thereby.

3. A structure for supporting equipment at an offshore location in a body of water comprising an upper barge unit having a buoyancy which is controllable over a sufficient range to cause said upper barge unit to float or sink as desired, said upper barge unit being provided with an open ended slot in one end thereof, a first lower barge section below said end of said upper barge unit and having a buoyancy which is controllable over a sufficient range to cause said section to float or sink as desired, a second lower barge section below said upper barge unit in horizontally spaced relation to said first lower barge section and having a buoyancy which is controllable over a sufficient range to cause said second section to float or sink as desired, an equipment platform above the level of the waves to be expected at said location and above said upper barge unit, a first group of substantially vertical support columns fixed to said upper barge unit and connected to said platform for vertical movement relative thereto, a second group of substantially vertical support columns fixed to said first lower barge section and connected to said platform for vertical movement relative thereto, the columns of said second group extending upwardly from said first lower barge section through said open ended slot in said upper barge unit whereby said upper barge unit may be moved laterally away from said columns of said second group, a third group of substantially vertical support columns fixed to said second lower barge section and connected to said platform for vertical movement relative thereto, the columns of said first group being spaced laterally away from the columns of said second and third groups, and means carried by said platform for releasably fixing each of said columns against movement relative to said platform so that after vertical movement of a column said platform may be supported thereby.

4. A structure for supporting equipment at an offshore location in a body of water comprising an upper barge unit having a buoyancy which is controllable over a sufficient range to cause said upper barge unit to float or sink as desired, said upper barge unit being provided with an open ended slot in one end thereof, a first lower barge section below said end of said upper barge unit and having a buoyancy which is controllable over a sufficient range to cause said section to float or sink as desired, a second lower barge section below said upper barge unit in horizontally spaced relation to said first lower barge section and having a buoyancy which is controllable over a sufficient range to cause said second section to float or sink as desired, an equipment platform above the level of the waves to be expected at said location and above said upper barge unit, a first group of substantially vertical support columns fixed to said upper barge unit and connected to said platform for vertical movement relative thereto, a second group of substantially vertical support columns fixed to said first lower barge section and connected to said platform for vertical movement relative thereto, the columns of said second group extending upwardly from said first lower barge section through said open ended slot in said upper barge unit, a third group of substantially vertical support columns fixed to said second lower barge section and connected to said platform for vertical movement relative thereto, a fourth group of substantially vertical support columns connected to said platform for vertical movement relative thereto and bearing freely at their lower ends against said first lower barge section, the columns of said first group being spaced laterally away from the columns of said second, third, and fourth groups, and means carried by said platform for releasably fixing each of said columns against movement relative to said platform so that after vertical movement of a column said platform may be supported thereby.

5. A structure for supporting equipment at an offshore location in a body of water comprising an upper barge unit having a buoyancy which is controllable over a sufficient range to cause said upper barge unit to float or sink as desired, a lower barge unit below said upper barge unit and having a buoyancy which is controllable over a sufficient range to cause said lower barge unit to float or sink as desired, an equipment platform above the level of the waves to be expected at said location and above said upper barge unit, a first group of substantially vertical support columns fixed to said upper barge unit and connected to said platform for vertical movement relative thereto, a plurality of spaced apart hollow guide tubes fixed to and extending upwardly from said upper barge unit a distance corresponding to the desired elevation of said platform above the surface of the water, a second group of substantially vertical support columns fixed to said lower barge unit and connected to said platform for vertical movement relative thereto, the columns of said second group being spaced laterally away from the columns of said first group and said guide tubes, bearing members fixed to the exterior of said tubes at the upper ends thereof and fixed to the exteriors of said columns at levels corresponding to the upper ends of said tubes so that said platform may rest on said bearing members when the barge units are afloat, a third group of substantially vertical support columns being fixed at their lower ends to said lower barge unit and slidably positioned in said guide tubes and being connected to said platform for vertical movement relative thereto, a latch adjacent each of said columns, each of said columns being provided with a series of vertically spaced latch-engaging means for cooperation with the latch adjacent thereto to prevent downward movement of the latches with respect to the columns when said latches are in engagement therewith, and means for adjustably mounting each of said latches on said platform so as to permit variation of the vertical position of each latch relative to said platform so that the loads on the several columns may be equalized.

6. A structure for supporting equipment at an offshore location in a body of water comprising an upper barge unit having a buoyancy which is controllable over a sufficient range to cause said upper barge unit to float or sink as desired, lower barge means below said upper barge unit and having a buoyancy which is controllable over a sufficient range to cause said lower barge means to float or sink as desired, an equipment platform above the level of the waves to be expected at said location and above said upper barge unit, a first group of substantially vertical support columns fixed to said upper barge unit and connected to said platform for vertical movement relative thereto, a second group of substantially vertical support columns fixed to said lower barge means and connected to said platform for vertical movement relative thereto, the columns of said second group being spaced laterally away from the columns of said first group, and means for releasably fixing each of said columns against movement relative to said platform so that after vertical movement of a column said platform may be supported thereby, said fixing means comprising a latch adjacent each of said columns, each of said columns being provided with a series of vertically spaced latch-engaging means for cooperation with the latch adjacent thereto to prevent downward movement of each latch means when the latch is in engagement therewith, and means for adjustably mounting each of said latches on said platform so as to permit variations of the vertical position of each latch relative to said platform.

7. In a method of establishing at an offshore location in a body of water an equipment support having an equipment platform, at least one upper barge means of controllable buoyancy below said platform, a single lower barge means of controllable buoyancy below said upper barge means and extending laterally beyond said platform, first and second groups of vertical columns fixed respectively to said upper and lower barge means and connected to said platform for vertical movement, and bearing means fixed to the exterior of each of said columns and having an upper surface upon which said platform may rest, the steps comprising: floating said support to said location with said upper barge means at the surface of the water, with said lower barge means slightly below the surface of the water, and with said platform raised on the bearing means of both groups of columns above the level of the waves which may be expected at said location; decreasing the buoyancy of said lower barge means to allow it to sink slowly to the bottom of the body of water and at the same time supporting said platform on the bearing means of said first group of columns carried by the still buoyant upper barge means on the surface of the water; fixing the columns of said second group against movement relative to said platform; decreasing the buoyancy of said upper barge means to allow it to sink to a position in which it rests upon the lower barge means; fixing the columns of said first group against movement relative to said platform; and then adjusting the loads carried by individual ones of said columns.

8. In a method of establishing at an offshore location in a body of water an equipment support having an equipment platform, at least one upper barge means of controllable buoyancy below said platform, a single lower barge means of controllable buoyancy below said upper barge means and extending laterally beyond said platform, first and second groups of vertical columns fixed respectively to said upper and lower barge means and connected to said platform for vertical movement, and bearing means fixed to the exterior of each of said columns and having an upper surface upon which said platform may rest, the steps comprising: floating said support to said location with said upper barge means at the surface of the water, with said lower barge means slightly below the surface of the water, and with said platform raised on the bearing means of both groups of columns above the level of the waves which may be expected at said location; decreasing the buoyancy of said lower barge means to allow it to sink slowly to the bottom of the body of water and thereby at the same time supporting said platform on the bearing means of said first group of columns carried by the still buoyant upper barge means on the surface of the water; fixing the columns of said second group against movement relative to said platform; decreasing the buoyancy of said upper barge unit to cause it to sink rapidly to a position a short distance below the surface of the water so that the weight of said platform will be transferred from the bearing means of the first group of columns to the second group of columns; further decreasing the buoyancy of said upper barge unit to allow it to sink slowly to a position in which it is supported by the bottom of the body of water; and then fixing the columns of said first group against movement relative to said platform.

References Cited in the file of this patent

UNITED STATES PATENTS

| | | |
|---|---|---|
| 720,998 | Becker | Feb. 17, 1903 |
| 2,217,879 | Willey | Oct. 15, 1940 |
| 2,236,682 | Gross | Apr. 1, 1941 |
| 2,589,146 | Samuelson | Mar. 11, 1952 |
| 2,603,068 | Wilson | July 15, 1952 |
| 2,627,390 | Schiefelbein | Feb. 3, 1953 |
| 2,631,008 | Kroll et al. | Mar. 10, 1953 |
| 2,652,693 | Goldman et al. | Sept. 22, 1953 |
| 2,667,038 | Bayley | Jan. 26, 1954 |
| 2,686,420 | Youtz | Aug. 17, 1954 |
| 2,691,272 | Townsend et al | Oct. 12, 1954 |
| 2,758,467 | Brown et al. | Aug. 14, 1956 |
| 2,775,869 | Pointer | Jan. 1, 1957 |
| 2,837,897 | Nedderman et al. | June 10, 1958 |
| 2,873,581 | Hazak | Feb. 17, 1959 |

FOREIGN PATENTS

| | | |
|---|---|---|
| 1,106,987 | France | July 27, 1955 |

OTHER REFERENCES

Construction Methods and Equipment, pages 94 and 95. August 1950.